H. C. SERGEANT.
Rock-Drills.

No. 140,596.

5 Sheets--Sheet 1.

Patented July 8, 1873.

Witnesses
P. Smith
G. R. Cullingworth

Inventor
Henry C. Sergeant

H. C. SERGEANT.
Rock-Drills.

No. 140,596.

Patented July 8, 1873.

5 Sheets--Sheet 2.

Witnesses
P. Smith
G. R. Cullingworth

Inventor
Henry C. Sergeant

H. C. SERGEANT.
Rock-Drills.

No. 140,596.

5 Sheets--Sheet 3.

Patented July 8, 1873.

Witnesses
P. Smith
G. R. Cullingworth

Inventor
Henry C. Sergeant

H. C. SERGEANT.
Rock-Drills.

No. 140,596.

5 Sheets--Sheet 4.

Patented July 8, 1873.

Witnesses
P. Smith
G. R. Cullingworth

Inventor
Henry C. Sergeant

H. C. SERGEANT.
Rock-Drills.
No. 140,596.
5 Sheets--Sheet 5.
Patented July 8, 1873.
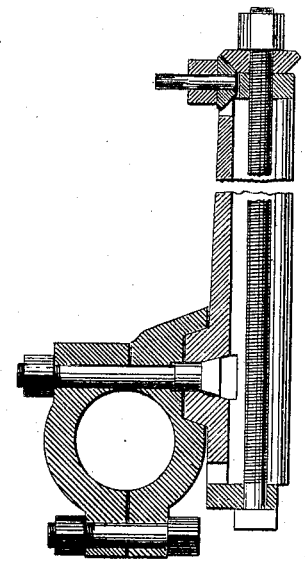
Fig. 13
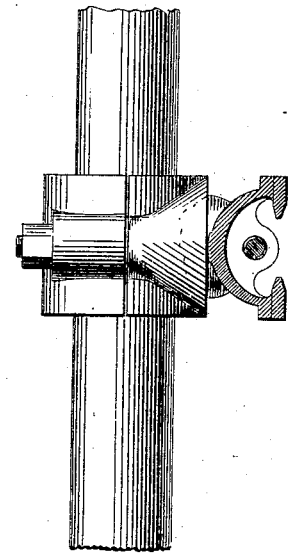
Witnesses
Inventor

UNITED STATES PATENT OFFICE.

HENRY C. SERGEANT, OF NEW YORK, N. Y.

IMPROVEMENT IN ROCK-DRILLS.

Specification forming part of Letters Patent No. 140,596, dated July 8, 1873; application filed March 20, 1873.

*To all whom it may concern:*

Be it known that I, HENRY C. SERGEANT, of the city of New York, county and State of New York, have invented a new and Improved Mode of Constructing Rock-Drills; and I do hereby declare that the following is a full and exact description thereof, reference being had to the accompanying drawings and the letters of reference marked thereon.

My improvement relates to that class of rock-drills known as the "percussion," having a steam or air cylinder with drill attached to one end of the piston-rod, the parts being arranged so as to combine simplicity with durability. The nature of my invention consists in constructing the steam or air cylinder for operating a percussion-drill with rotating valves so arranged that the piston can operate and control the valves at any portion of the stroke of the piston, so that the steam can be used expansively, and the exhaust can be out of the way in time to allow the incoming pressure to cushion and stop the piston at either end of the cylinder.

I have also arranged for the better protec- of the parts a cushion of rubber or some other suitable material at one end of the cylinder, so that it can be used for the double purpose of cushion and packing to the piston-rod.

The manner of revolving the drill, the automatic feed, the frame or tripod, and the clamp are all portions of my improvement.

The parts being shown in the accompanying drawings with corresponding letters of reference as seen in the different views, I now proceed to describe their construction and operation.

Figure 1:
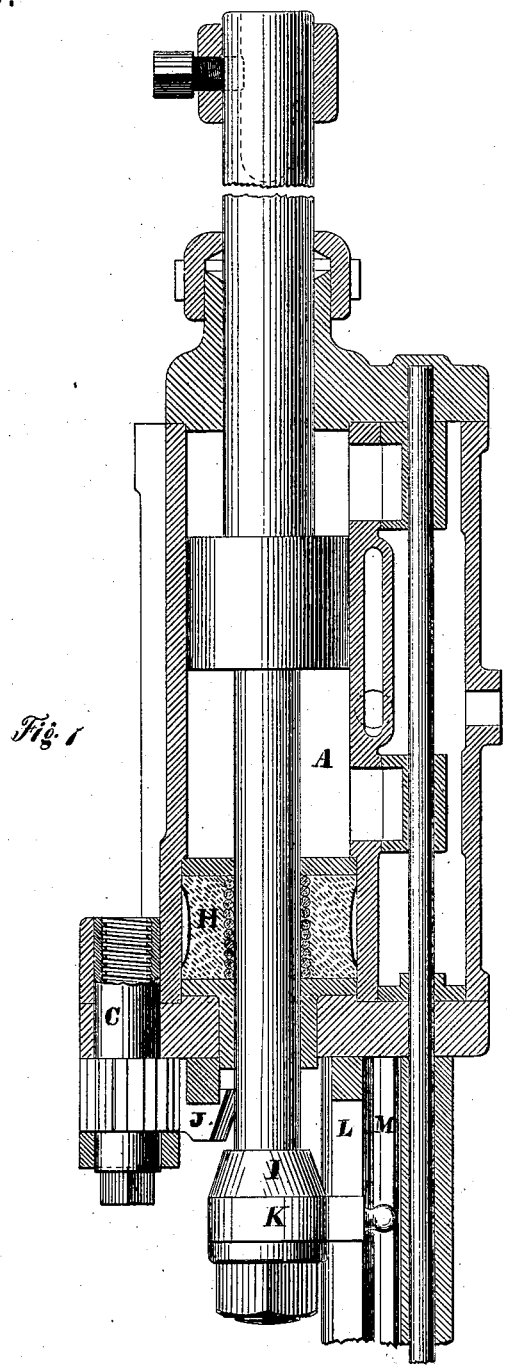
Figure 3:
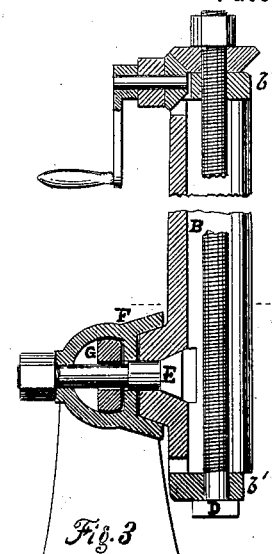
Figure 3:
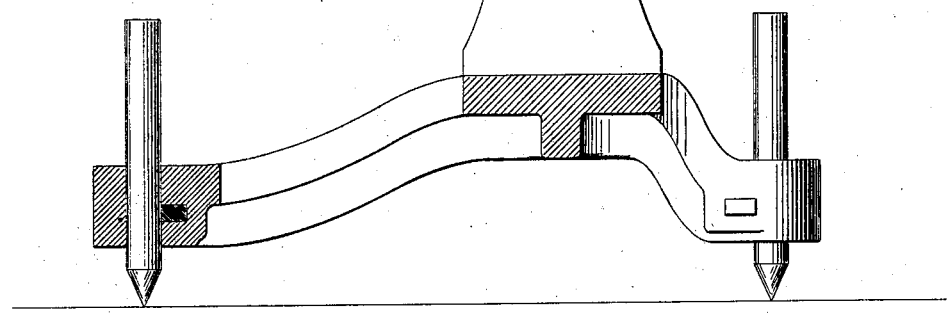
Figure 2:
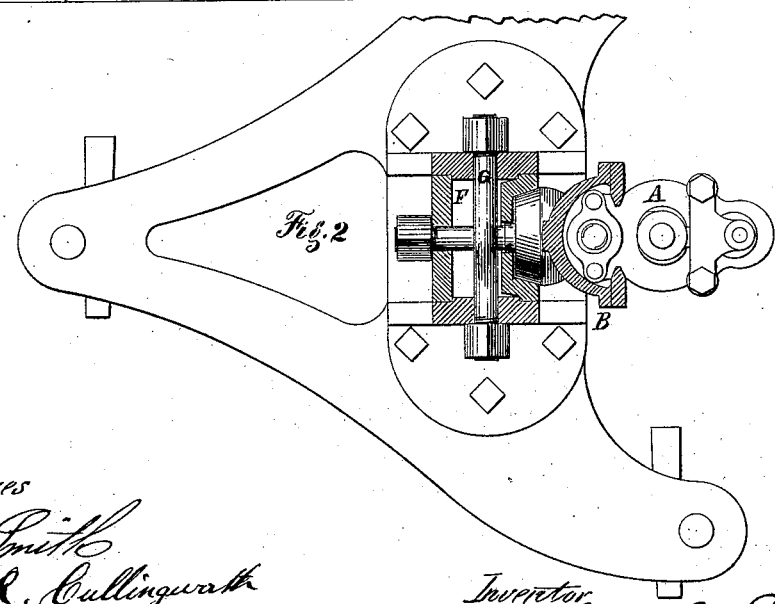
Figure 9:
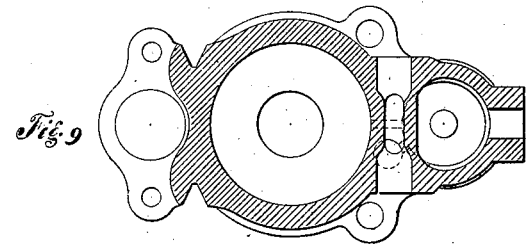

The cylinder A, as seen in Figures 1 and 2, is arranged to slide in guides fastened to the back, shown by letter B in Figs. 2 and 3. The cylinder can be raised or lowered by means of the screw running the whole length of the back and passing through the nut attached to the cylinder, shown at C in Fig. 1. Bevel-wheels with crank are used for convenience in turning the screw by hand, the nut C being stationary when the screw is being revolved. The back B has two heads or ends bolted to it, and so arranged that they can be taken off and reversed, thus enabling the operator to use either the long or the short end of the back toward the drill. For open cutting the short end would be used, as shown in Fig. 3. For tunneling the long end would be used. The feed-screw D passes through the heads of the back, and by turning the nut on the upper end the screw is made fast and prevented from revolving, also adding strength and solidity to the back, all the strain coming direct on the heads. The back is cast with a cone on it near one end, arranged to receive one large bolt through the center of the cone, shown by letter E in Fig. 3. This cone has a corresponding piece cast to recieve it, so that by screwing up the nut the back is held solid to the frame or female part of the clamp, shown by letter F in Figs. 2 and 3. The clamp is supported by two upright pieces bolted to a base, so arranged that it can be leveled by three adjustable points fastened to the desired positions by keys. The bolt G, shown in Figs. 2 and 3, is for the purpose of closing the two upright pieces and holding the female portion of the clamp fast.

This arrangement of frame, clamp, and back enables the operator to adjust the drill to any desired position by simply operating the two bolts E and G.

The drawings, Fig. 13, represent the form of clamp to be used in tunneling, and the manner of attaching the back to clamp, and the clamp to the arm which supports the drill.

The cylinder A is made of cast-iron or any suitable material, bored out, and having two heads fitted and fastened to it, and a piston fitted with rods extending out through both heads, one of which is used for the purpose of clamping the drill; the other is used for operating the valves, feeding and revolving the drill.

Figure 7:
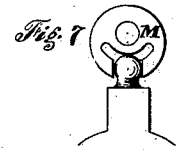
Figure 12:
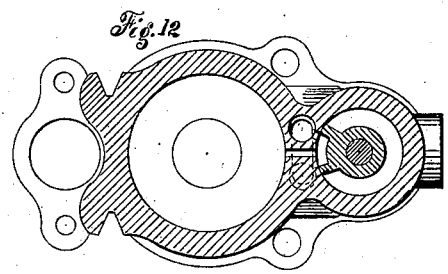
Figure 11:
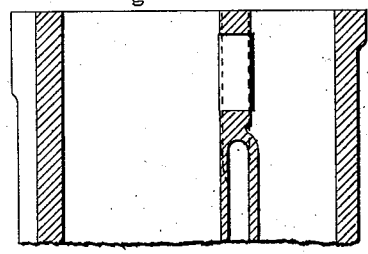

At one end of the cylinder is formed a cushion, as seen at letter H, Fig. 7, which serves the double purpose of packing-box to the piston and preventing it from striking either head of the cylinder.

This cushion is constructed in the following manner: The cylinder having a recess sufficient to form a bearing for a ring fitting close around the piston, leaving a space suitable to receive a ring of rubber or some other elastic substance around the piston and inside of the cylinder, between the rubber and piston I insert cotton or hemp, or any substance that will afford less friction than the rubber, for the purpose of making a steam-tight joint and keeping the oil and wear from that which composes the cushion. Behind this I insert the second ring into the end of the cylinder, which has a boss of sufficient length to project through the cylinder-head. This head is fastened to the cylinder by means of screws holding the packing-rings and cushion firmly in their place.

If by any accident to the valve-motion the steam-cushion should fail to prevent the drill and piston from traveling too far, it would be stopped by the piston coming in contact with the ring and cushion inside of cylinder, and in the opposite stroke by the cone I coming in contact with the boss projecting through the cylinder-head, which presses the cushion in the opposite direction. This last-described operation can never take place while the drill is cutting and the feed working properly. The drill striking the rock prevents the cone I from coming in contact with the cushion.

The automatic feed is obtained in the following manner: The cone I attached firmly to the piston, working closely to the pawl, as shown by J in Figs. 1 and 8, having an incline upon its side corresponding with the cone. When the drill has cut the rock sufficiently to allow the piston to pass a little further, or make the stroke a little longer, the cone will come in contact with the incline of the pawl, and force it from the piston-rod, the end of the pawl working in the ratchet-wheel turning the nut, around which is working in bearings fastened to the body of the cylinder, the screw being stationary at the time the cylinder and drill are fed out or down, as the case may be. When the piston is moved back the pawl is returned to its original place by means of a spring, and, if necessary, will feed one or more teeth on the ratchet-wheel at each stroke of the drill.

Figure 8:
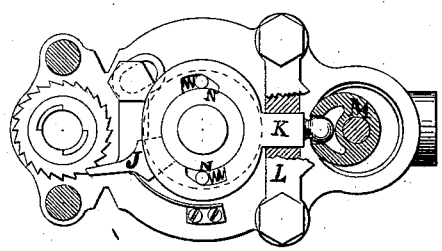
Figure 4:
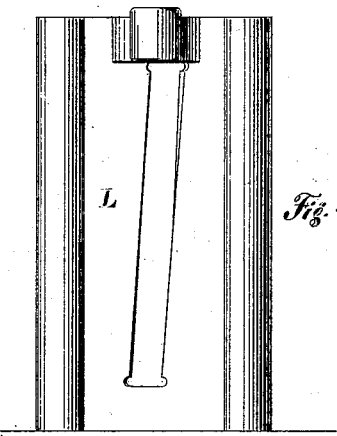
Figure 5:
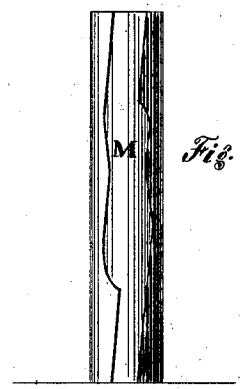
Figure 6:
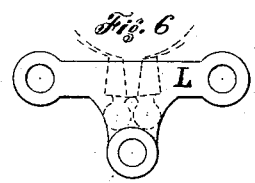

The piston and drill are made to reciprocate and revolve in the following manner: The short arm K, having a hole through one end, as shown in Figs. 1 and 8, being attached to one end of the piston, and working closely between two large surfaces held firmly together by means of a screw, a portion of the arm working between two parallel spiral surfaces fastened firmly upon the cylinder-head, (see letter L, in Figs. 1, 4, and 8,) the extreme end of the arm passing through the inclines and working between a slotted arm or circular casting surrounding the valve-stem, and long enough for the arm K to continue in the slot the entire length of the stroke to the piston. This slotted arm is shown at letter M, in Figs. 1, 5, 7, and 8.

Figure 10:
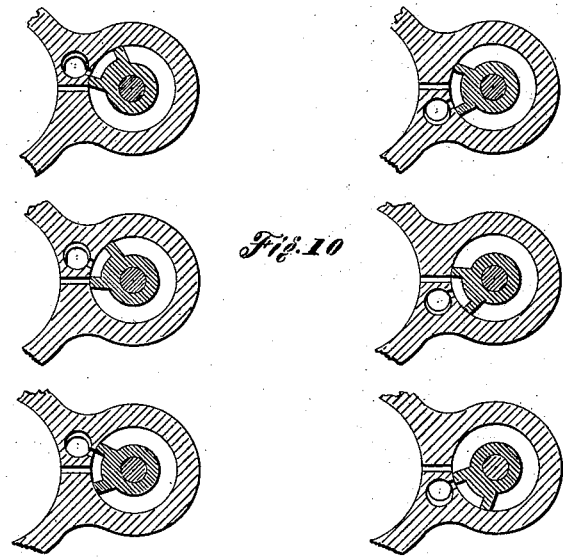

The valve-chamber is cylindrical, and contains two rotating valves attached to one rod. Figs. 1, 9, 11, and 12 show the inlet and outlet passages of the valve-chamber and cylinder. Fig. 10 shows the two valves in their different positions, and their relation to each other during the different portions of the stroke of the piston. By admitting steam to the cylinder through the valve-chamber the piston is driven from one end of the cylinder to the other. The arm K is compelled to rotate and reciprocate by operating in between the spiral inclines. The extreme end of the arm causes the valves to rotate, thereby reversing the pressure upon the piston and giving it a return stroke. The peculiar form of of the slot in the arm M attached to the valve-stem controls the desired motion of the valves. As it is now shown, the valve is operated to cut off the steam at half-stroke, keeping the exhaust-port wide open, and reversing and repeating the operation. The slot in the cylindrical arm M is formed by being cast upon a chill, and can be varied to give any motion to the valve that may be required. N N, in Fig. 8, represent two round steel pieces operating on two inclines cut out of the arm K on the side next to the piston-rod, and held to their proper place by means of two spiral springs. This is to form a friction-clutch, which gives a rotating motion to the piston by forming a connection with the rotating arm K at each alternate stroke of the piston.

What I claim as new, and desire to secure by Letters Patent, is—

1. The base or tripod of cast-iron, with two upright pieces forming a jaw for holding the clamp F, in combination with the adjustable feet, operating substantially as shown and described.

2. The cone cast on the back B of a rock-drill, in combination with the casting F, made to receive the cone, and bolted together, substantially as shown and for the purpose described.

3. The reversible ends b' b', in combination with the extended feed-screw D, so as to allow reversing and bolting together, as shown and described.

4. The combination of the crank, bevel-wheels, reversible ends, and feed-screw, operating substantially as described.

5. The arm K, working in between the flanges or collars, and having a reciprocating and oscillating motion, in combination with the stationary spiral incline L and arm M, for the purpose shown and described.

6. The elastic cushion and packing-box H, constructed and operated as shown and described.

7. The combination of the cylinder A, piston-rod, and elastic cushion H, arranged and operated substantially as shown and described.

HENRY C. SERGEANT.

Witnesses:
P. SMITH,
G. R. CULLINGWORTH.